United States Patent

[11] 3,569,925

[72] Inventors Elmer Ray Tyler
2258 S. Virginia, Springfield, Mo. 65804;
Charles Preuitt Battaile, 2123 Brighton Drive, Springfield, Mo. 65804; Kenneth I. Dyche, 4513 N. "O" St., Fort Smith, Ark. 72901
[21] Appl. No. 731,385
[22] Filed May 23, 1968
[45] Patented Mar. 9, 1971

[54] TRAIN-HANDLING INDICATOR
15 Claims, 15 Drawing Figs.
[52] U.S. Cl. .................................................. 340/24, 40/42, 340/324, 340/378
[51] Int. Cl. .................................................. B61l 25/00
[50] Field of Search .......................................... 340/23, 24; 40/42, 43, 44, 116(Inquired); 246/124(Inquired)

[56] References Cited
UNITED STATES PATENTS

| | | | |
|---|---|---|---|
| 494,189 | 3/1893 | Clark | 40/43 |
| 1,690,244 | 11/1928 | Periale | 40/42 |
| 2,194,615 | 3/1940 | Roberts | 40/42 |
| 2,694,269 | 11/1954 | Kirby | 40/42 |
| 3,345,636 | 10/1967 | McLaren | 340/24 |

Primary Examiner—Thomas B. Habecker
Assistant Examiner—Howard S. Cohen
Attorneys—Clarence A. O'Brien and Harvey B. Jacobson ABSTRACT: Position-indicating apparatus operably driven from a speed recorder for continuously indicating, on a profile film tape, the location of the full length of a train. The recording movement of the speed recorder is mechanically picked up by a control unit and transmitted by means of electrical impulses to a film strip actuating means for a synchronized movement of the film strip in conjunction with the travel of the vehicle. The speed of the film strip is adjustable through the control unit to bring the movement of the film strip into synchronization with the movement of the vehicle. The location indicating unit includes means for indicating the full length of the train in relation to the moving profile film tape, as well as means for varying this length indication to correspond to different length trains.

Patented March 9, 1971
3,569,925
6 Sheets-Sheet 1
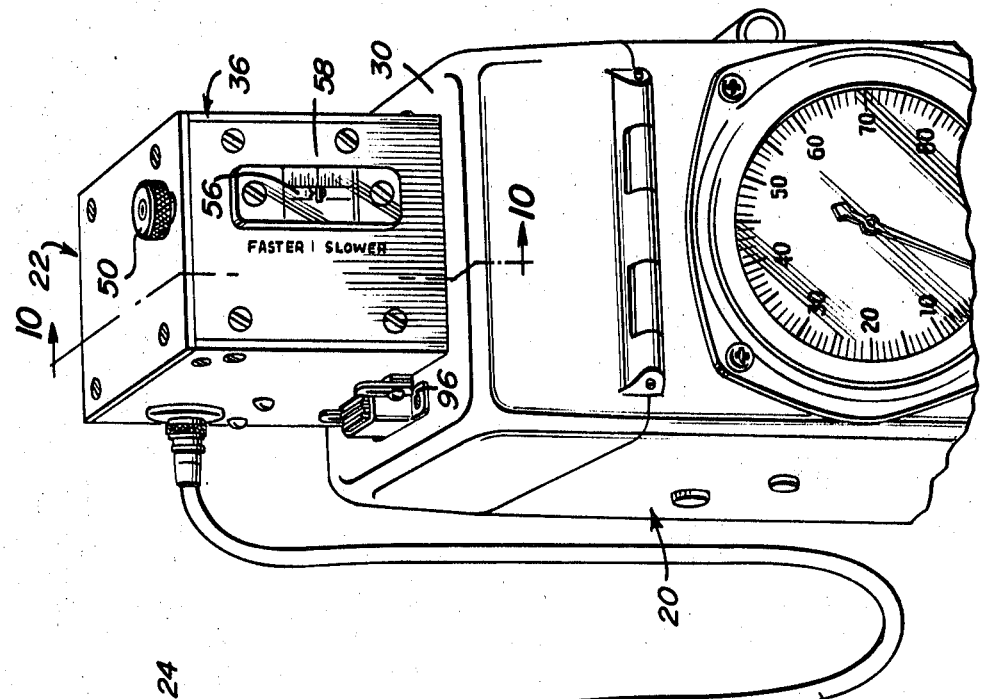
Fig. 1
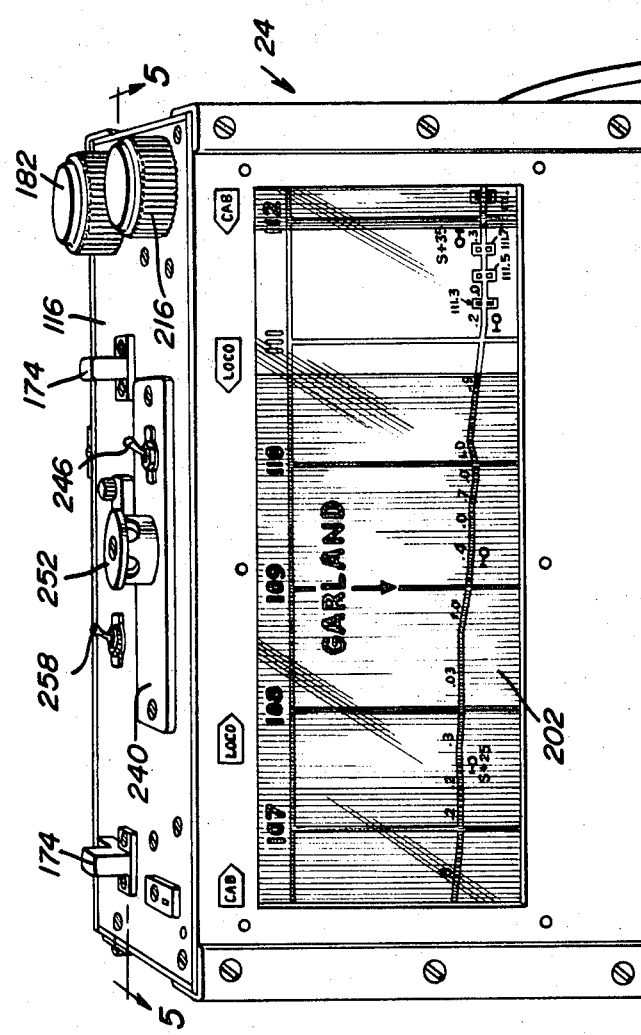
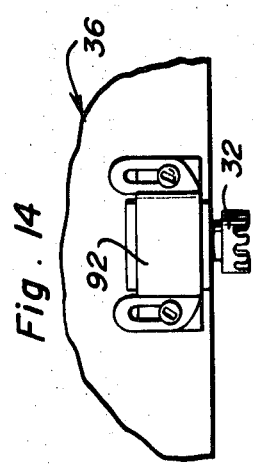
Fig. 14
Elmer Ray Tyler
Charles Preuitt Battaile
Kenneth I. Dyche
INVENTORS
BY Clarence A. O'Brien
and Harvey B. Jacobson
Attorneys

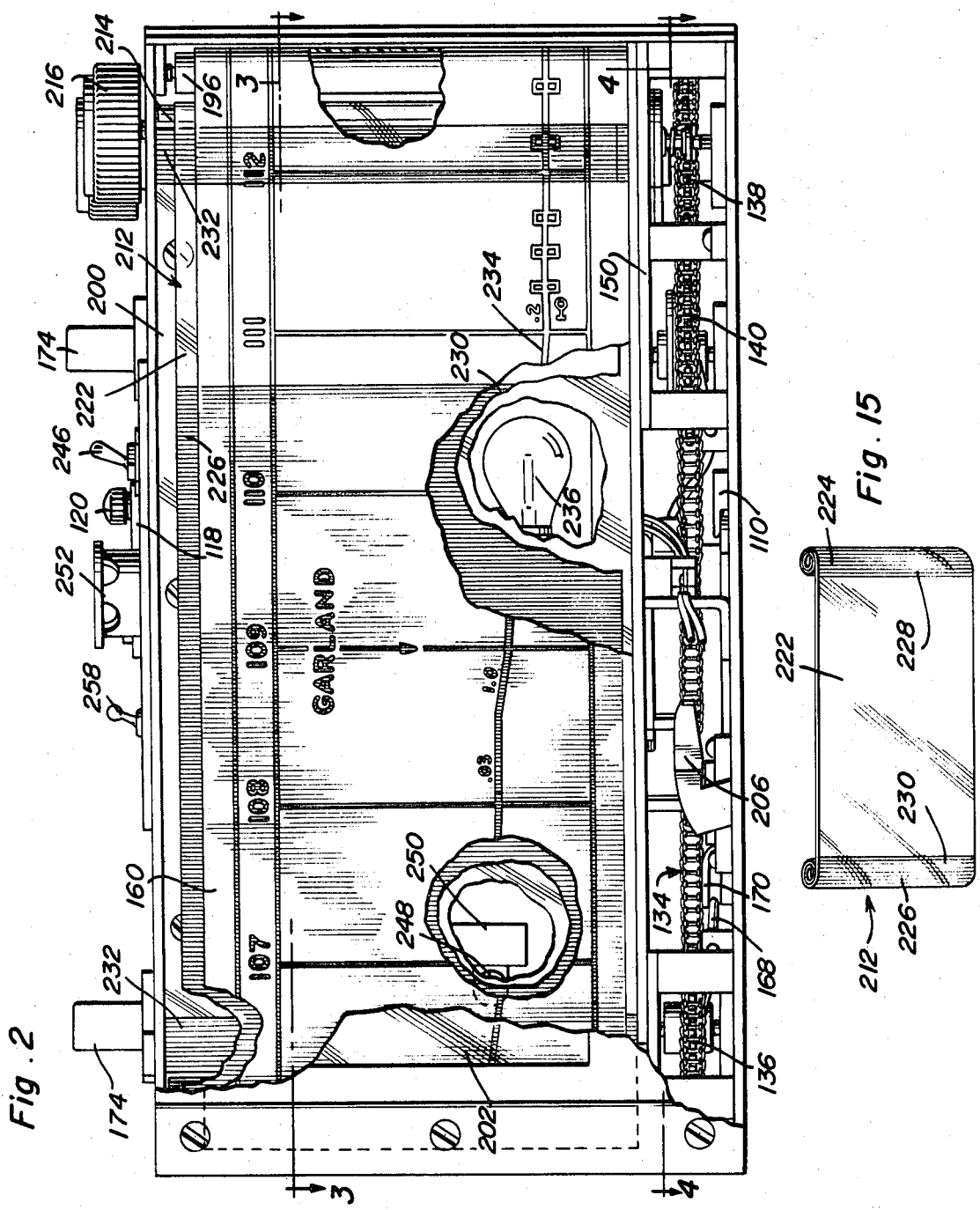

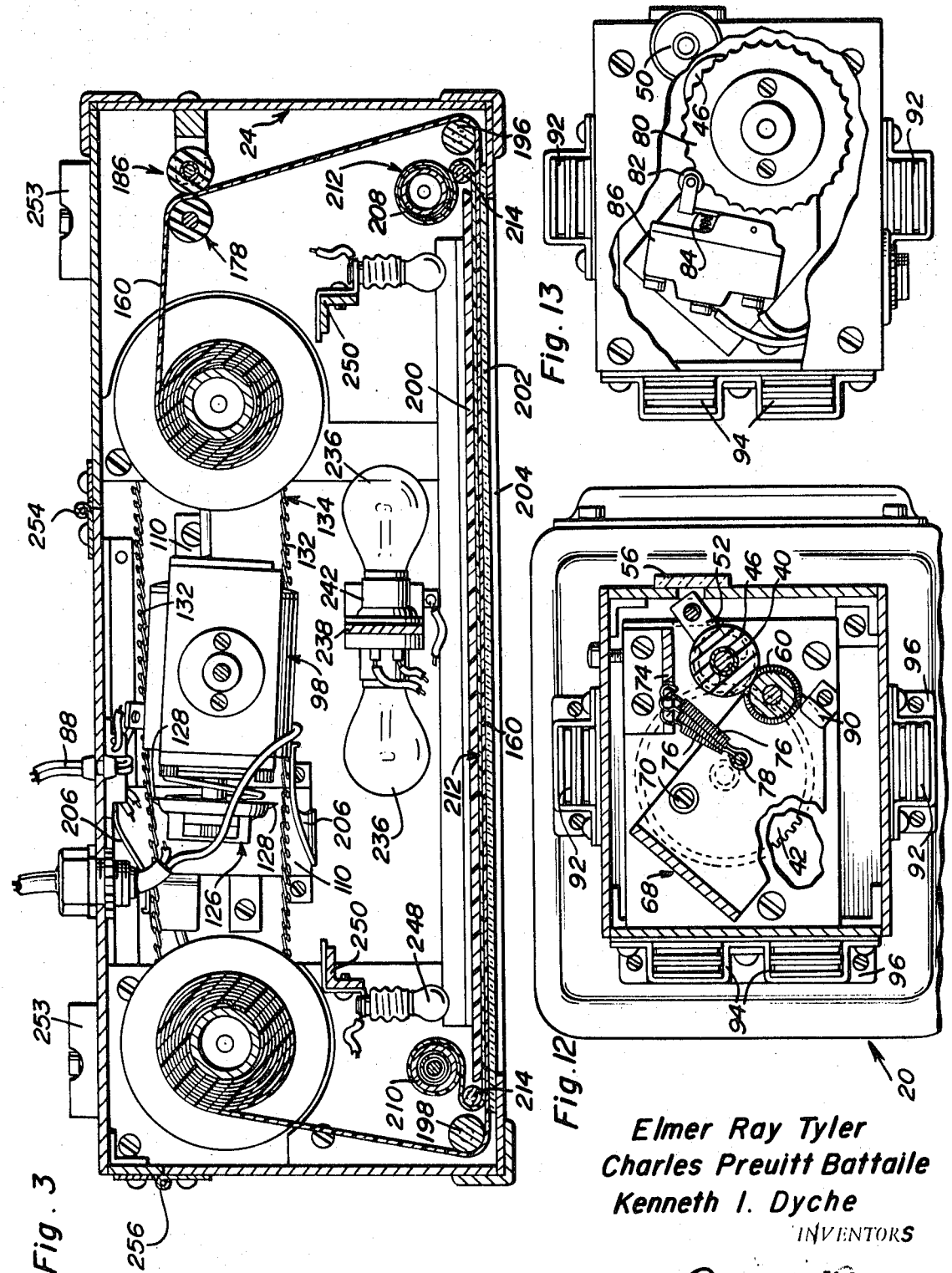

Patented March 9, 1971
3,569,925
6 Sheets-Sheet 4
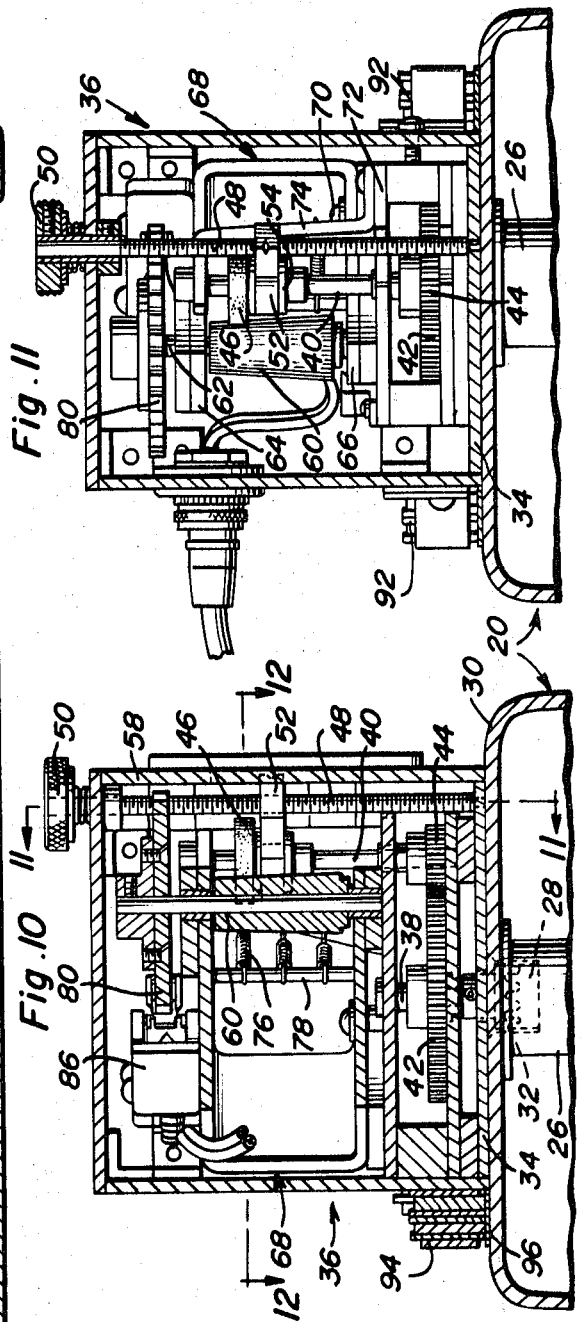
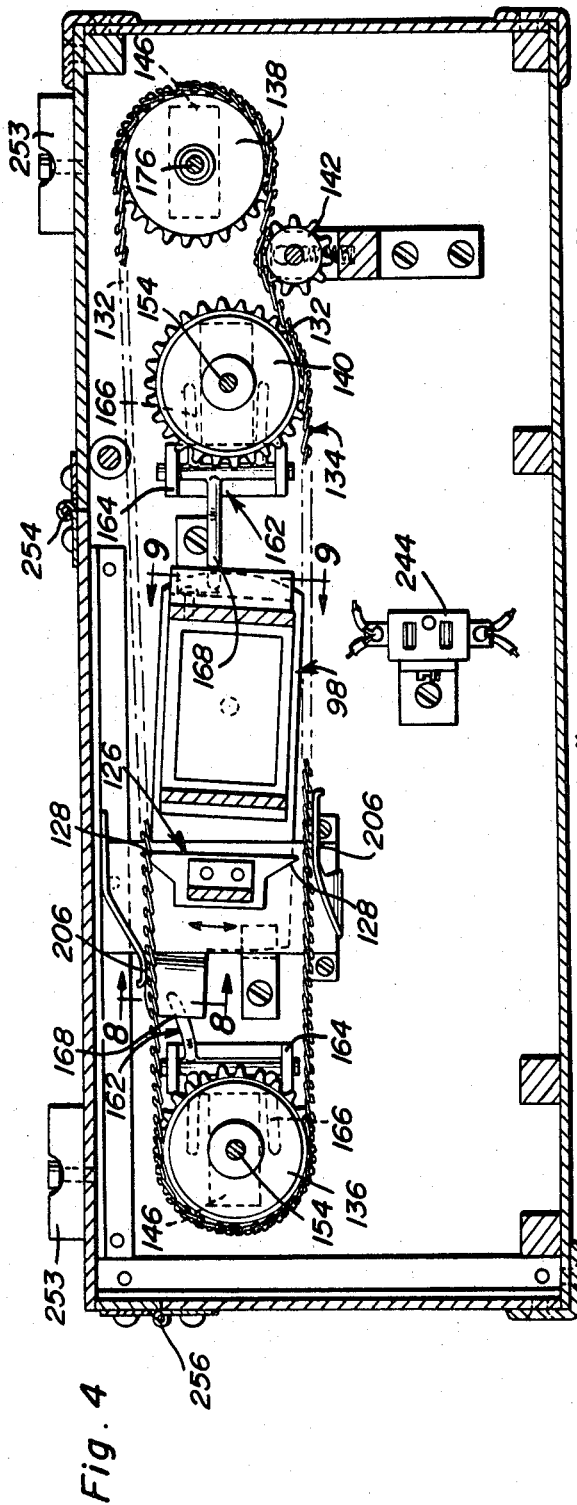
Elmer Ray Tyler
Charles Preuitt Battaile
Kenneth I. Dyche
INVENTORS
BY Clarence A. O'Brien
and Harvey B. Jacobson
Attorneys

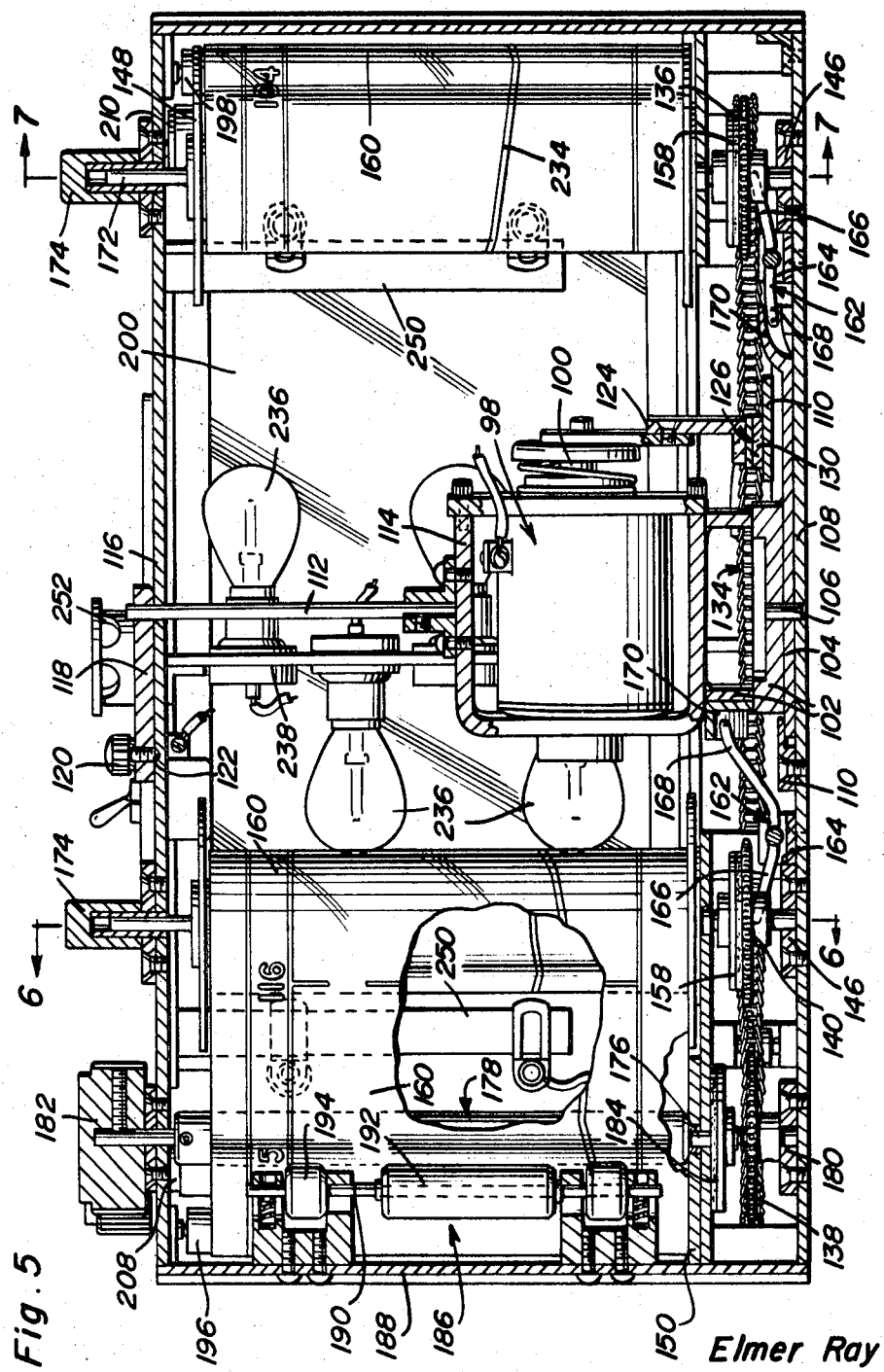

Patented March 9, 1971 3,569,925
6 Sheets-Sheet 6
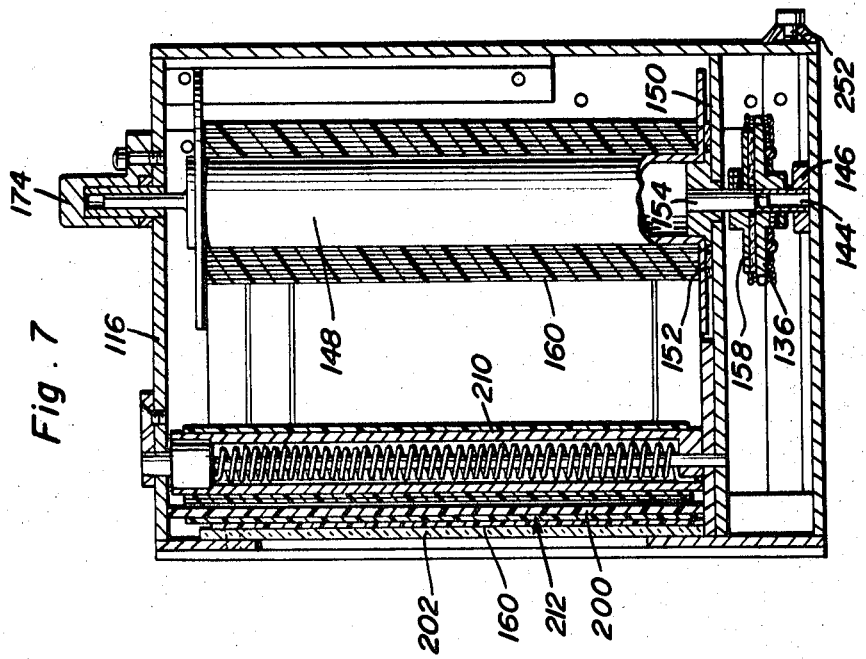
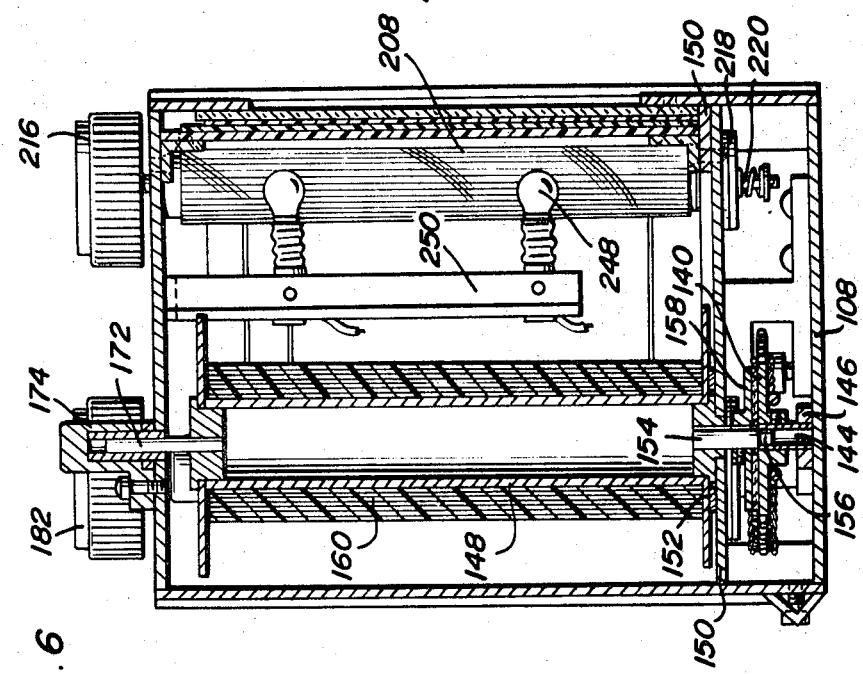
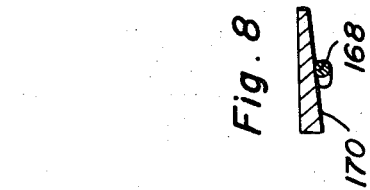
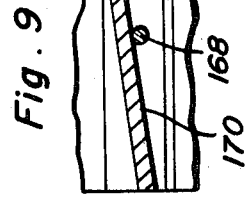
Elmer Ray Tyler
Charles Preuitt Battaile
Kenneth I. Dyche
INVENTORS

TRAIN-HANDLING INDICATOR

The instant invention is generally concerned with the handling of trains, and more particularly relates to an indicator for presenting a continuing pictorial representation of the profile of the track being traversed by the train, in conjunction with significant features to be encountered, including highway crossings, populated areas, signals, speed restrictions, etc.

The safe and efficient operation of a train along a given track requires a relatively intimate knowledge of the conditions which are to be encountered along the route, including both ascending and descending grades, curves, signal systems, crossings, speed restrictions, etc. While this information can be obtained through experience, as by a repeated traversing of the route, and be memorized by an experienced train operator, there has been, prior to the instant invention, no suitable means whereby a student train operator, or for that matter an experienced operator unfamiliar with a particular route, can be made aware of all of the factors to be considered along a particular route. Thus, the instant invention, as an aid to all train operators, proposes an automatic route indicator whereby a continuous indication is given of all of the particular factors to be encountered, such being provided both for a significant distance forward of the train, as well as for the full length of the train itself. Of particular significance is the fact that the full length of the train can be indicated on the moving profile simulating tape so as to afford the operator with an immediate awareness of the relationship of each portion of the train to the track profile. The apparatus incorporates adjustable speed control means whereby an exact synchronization of the apparatus with the speed of the train can be effected both rapidly and simply. The speed control unit is interposed between the conventionally provided speed recorder, now used to provide a running record of the train speed at various points, and transmits the movement of the tape-metering spool in the recorder, through electrical impulses, to the film-mounting unit for effecting a synchronized movement of the film.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a view of the two components or units of the apparatus of the instant invention operatively interconnected with each other and with a speed recorder;

FIG. 2 is an enlarged front elevational view, with portions broken away for purposes of illustration, of the train position indicating unit;

FIG. 3 is a cross-sectional view taken substantially on a plane passing along line 3–3 in FIG. 2;

FIG. 4 is a cross-sectional view taken substantially on a plane passing along line 4–4 in FIG. 2;

FIG. 5 is a cross-sectional view taken substantially on a plane passing along line 5–5 in FIG. 1;

FIG. 6 is a cross-sectional view taken substantially on a plane passing along line 6–6 in FIG. 5;

FIG. 7 is a cross-sectional view taken substantially on a plane passing along line 7–7 in FIG. 5;

FIG. 8 is a cross-sectional detail taken substantially on a plane passing along line 8–8 in FIG. 4;

FIG. 9 is a cross-sectional detail taken substantially on a plane passing along line 9–9 in FIG. 4;

FIG. 10 is an enlarged cross-sectional view taken substantially on a plane passing along line 10–10 in FIG. 1;

FIG. 11 is a cross-sectional view taken substantially on a plane passing along line 11–11 in FIG. 10;

FIG. 12 is a cross-sectional view taken substantially on a plane passing along line 12–12 in FIG. 10;

FIG. 13 is a top plan view of the speed control unit with a portion of the housing broken away for purposes of illustration;

FIG. 14 is a side elevational detail of one side of the speed control unit illustrating one mounting magnet and the coupling used to engage this unit with the speed recorder; and FIG. 15 is a perspective view of the train length indicating ribbon.

Referring now more specifically to the drawings, reference numeral 20 generally designates a conventional speed recorder or other device utilized in providing an indication of the speed of the vehicle through an operative engagement with the wheels. To this recorder 20 is mounted the first component of the apparatus of the instant invention, the speed controller 22. The speed controller 22 is in turn electrically engaged with the second component, the train position indicator 24 for effecting, through electrical impulses generated within the controller 22, a continuing visual indication of the travel of the train, induced by the recording movement of the recorder 20.

The speed controller 22 is coupled to a distance measuring portion of the recorder 20, for example the tape-measuring spool 26, through a two-part coupling, one part 28 of which is affixed to the spool 26 and accessible through an opening in the top wall of the recorder housing 30. The second part 32 of the coupling, having teeth meshingly engageable with similar teeth on the part 28, is orientated generally below the bottom wall 34 of the housing 36 of the controller 22 and is affixed to a vertical rotatably mounted shaft 38.

The shaft 38 drives a vertically elongated rotatably mounted drive wheel shaft 40 through an enlarged ring gear 42 mounted on the shaft 38 meshed with a reduced diameter pinion 44 mounted on the drive wheel shaft 40. An elastomeric friction drive wheel 46 is keyed to the shaft 40 for rotation therewith, the key means utilized in mounting the wheel 46, while preventing relative rotation between the wheel 46 and the shaft 40, enabling a vertical adjustment of the wheel along the shaft 40. This vertical adjustment of the wheel 46 is effected through an elongated adjusting screw 48 rotatably positioned vertically through the speed controller housing 36 and manipulated through an enlarged knob 50 on the upper end thereof. A yoke or fork 52 is threadedly mounted on the adjusting screw 48 and engages a collar or sleeve construction 54 which actually mounts the wheel 46 on the shaft 40. Thus, as the adjusting screw 48 is rotated, the collar-encircling fork 52 will effect a corresponding upward or downward movement of the friction drive wheel 46. The actual vertical position of the drive wheel 46 can be ascertained through a calibrated aperture 56 provided in the front panel or wall 58 of the controller housing 36. The friction drive wheel 46 engages and frictionally drives a speed-varying or adjusting cone 60 fixed in surrounding relation to a third vertically orientated rotatably mounted shaft 62. Thus, it will be appreciated that the vertical adjustment of the friction drive wheel 46 cooperates with the cone 60 in varying the speed at which the shaft 62 is driven.

The cone shaft 62 is mounted between the upper and lower flanges 64 and 66 of a bracket 68 pivotally mounted on a pivot pin 70 extending through the lower flange 66 and a rigid horizontal deck 72 provided therebelow immediately above the gear 42 and pinion 44. The pivot pin 70 is located remote from the cone shaft 62 in order to enable a pivotal movement of the cone shaft toward and away from the drive wheel 46. A second bracket 74 rotatably mounts the upper end of the drive wheel shaft 40 and, through three coiled tension springs 76, engaged at one end with the bracket 74 and at the other end with a vertical rod 78 mounted between the upper and lower flanges 64 and 66 of the bracket 68, biases the bracket 68, and hence the speed cone 60, toward the drive wheel 46, thereby maintaining a positive drive transmitting frictional engagement between the drive wheel 46 and the cone 60 regardless of the vertical adjustment of the wheel 46.

An enlarged index cam or camming wheel 80 is mounted on the cone shaft 62 above the upper bracket flange 64 and cammingly engages a roller-type cam follower 82 mounted on the control arm 84 of a microswitch 86. The index cam 80 will normally be provided with 32 camming segments completely thereabout and will travel at one revolution per mile, each of the cam segments actuating the microswitch 86 and transmitting an electrical impulse through a conductor cable 88 to the train position indicator 24. It will be noted that the microswitch 86 is mounted directly on the upper flange 64 of the bracket 68 whereby the relationship between the switch 86 and the index cam 80 is maintained regardless of the pivotal adjustment of the bracket 68. Incidently, the bracket 68 can be stabilized by a small angular holddown bracket 90 freely engaged over the free end of the lower bracket flange 66 adjacent the cone 60 in a manner which does not interfere with the desired pivotal movement of the bracket 68.

In order to secure the speed controller unit 22 to the speed recorder unit 20, it is proposed that magnets be utilized. As such, single magnet assemblies 92 are secured to the opposed sidewalls of the controller housing 36 and a double magnet assembly 94 is secured to the rear wall of the housing 36, these magnet assemblies being located adjacent the lower edges of the corresponding walls and adapted to magnetically secure the controller 22 to magnetically attractable plates 96 secured to the top wall of the recorder housing.

The cam controlled microswitch 86 periodically pulses or energizes an enlarged solenoid 98 mounted within the train position indicating unit 24 so as to effect a reciprocal movement of the solenoid core or armature 100. The solenoid 98 is horizontally located toward the rear of the unit 24 and is mounted, through spacing plates or members 102, on a flat base plate 104 which is pivotally secured, by the pivot pin 106, to the bottom wall 108 of the housing of the unit 24. Suitable holddown brackets 110 retain the base plate 104 while still allowing for the desired limited rotational movement thereof about the pivot pin 106. The rotational positioning of the solenoid between the two desired positions, which shall be explained in more detail subsequently, is effected through an elongated control shaft 112 fixed to the top of the solenoid bracket 114 and extending vertically therefrom through the top wall 116 where it is rigidly affixed to a horizontal control lever 118. The outer end of the control lever 118 includes a manually adjustable lock screw 120 threaded therein and selectively extensible into either of two sockets formed within the top wall 116 and constituting the two swung positions of the control lever 118 which correspond to the two desired rotated position of the solenoid 98. In other words, when one desires to adjust the solenoid 98 from one position to the other, the lock screw 120 is released from one of the holes 122, the control lever 118 swung so as to position the lock screw 120 over the second hole 122, and the screw 120 engaged with the second hole 122.

A depending bracket 124 is mounted on the projecting end of the armature 100. This bracket 124 mounts, on the lower end thereof, a horizontal transversely orientated pawl plate 126 having a pawl 128 formed on each outwardly directed end thereof. A support plate 130 is affixed to the bottom of the pawl plate 126 and slidably lies on the underlying holddown plate or bracket 110.

The rotational mounting of the solenoid 98 for movement between two positions is so as to effect a selective engagement of the pawls 128 with the opposed runs 132 of an endless horizontally orientated ladder drive chain 134 located to the opposite sides of the solenoid 98. Noting FIGS. 3 and 4, when one pawl 128 is engaged, the other pawl 128 is of course disengaged, thus, it will be appreciated that a reversal of the direction of movement of the drive chain 134 can be easily effected through a disengagement of one pawl and an engagement of the opposed pawl by means of a rotation of the solenoid 98.

The endless drive chain 134 is engaged with a first tape spool drive sprocket 136, an opposed metering roller drive sprocket 138, and a second tape spool drive sprocket 140 slightly inward of the metering roller sprocket 138. With particular reference to FIG. 4, it will be noted that the tape spool drive sprockets 136 and 140 are located to the opposite sides of the solenoid 98 and that the metering roller sprocket 138 is slightly laterally offset from the sprockets 136 and 140 so as to allow for the outer run 132 of the chain 134 to clear the intermediate sprocket 140 while the inner run 132 of the drive chain 134 is maintained in driving engagement with the sprocket 140 by means of a spring-loaded idler sprocket 142 engaged with the chain 134 between the sprockets 138 and 140.

With particular reference to FIGS. 6 and 7, it will be noted that each of the spool drive sprockets 136 and 140 is affixed to a depending sleeve-like support shaft 144 which is rotatably received within a bearing member 146 affixed to the bottom wall 108. A vertically elongated film strip or tape spool 18 is mounted on a horizontal deck 150 in vertical alignment above each of the spool drive sprockets 136 and 140. An annular friction member 152 is provided between the lower end of each spool 148 and the deck 150 so as to avoid any slippage therebetween. Further, each spool 148 includes a depending shaft 154, the lower end 156 of which is of a reduced diameter and slidably received within the upper end of the associated sleevelike shaft 144. This depending shaft 154 has an enlarged friction clutch plate 158 rigid therewith in overlying relation to the corresponding sprocket, either 136 or 140, immediately below the deck 150. The sprockets 136 and 140 are in turn vertically adjustable, through a sliding of the sleevelike shaft 144 within the bearings 146, so as to selectively engage with or disengage from the clutch plates 158 whereby either spool 148 may be positively driven while the second spool 148 is free to rotate in response to the film or tape 160 being drawn therefrom, this free movement being effectively controlled by the associated friction disc 152 so as to ensure a controlled movement of the film therefrom.

The clutching and declutching of the two spools 148 is synchronized with the shifting of the solenoid 98 and the engagement of the opposed chain runs 132 by the pawls 128 whereby, upon a shift of the solenoid, the chain will, through the reciprocal movement of the armature 100, be driven in a first direction and the tape wound upon the one spool 148 having the clutch engaged. Upon a shifting of the solenoid, the chain will be driven in the opposite direction, the first spool will be declutched, and the second spool, having the clutch engaged, will be driven so as to wind the tape thereon. This clutching and declutching of the spools 148 is effected, as noted above, by a vertical shift in the sprockets 136 and 140. In order to effect this, a pivotally mounted sprocket shifting member 162 is pivotally mounted, by suitable bracket means 164, to each side of the solenoid 98. Each of the sprocket shifting members 162 includes a first yoke defining portion 166 which underlies the corresponding sprocket, either 136 or 140, and a second cam following end portion 168 which underlies a cam surface 170 defined at each side of the solenoid 98. Thus, as the solenoid 98 is shifted through the control lever 118, the camming surfaces or portions 170, located to the opposite sides of the axis of rotation of the solenoid 98, will, in a coordinated manner and through the sprocket shifting members 162, effect an upward movement of one sprocket into clutched engagement with the corresponding clutch plate, and a downward movement of the second sprocket so as to effect a declutching thereof. Incidently, with reference again to FIGS. 6 and 7, it will be noted that each of the spools 148 is provided, at the upper end thereof, with a vertically projecting plug mounted shaft 172 which is rotatably received within an appropriate bearing unit 174 mounted on the top wall 116, thereby providing for a stabilized rotational supporting of the upper end of the spool 148.

With reference now to the metering roller sprocket 138, this sprocket is affixed to the shaft 176 of the tape-metering roller 178, the shaft 176 being rotatably supported at the lower end thereof in an appropriate bearing unit 180 affixed to the bottom 108 and having the upper end thereof affixed to a control knob 182 overlying the top wall 116. The metering roller 178 itself extends between the top wall 116 and the spool support deck 150 so as to receive and both assist in and control the movement of the tape or film 160. In order to prevent a completely free rotation of the metering roller 178, an appropriate friction disc 184 is slidably mounted on the roller shaft 176 and spring-biased into engagement with the undersurface of the deck 150, this disc 184 of course being mounted on the shaft 176 solely for longitudinal movement thereon and being locked thereto against relative rotational movement.

A spring-loaded pressure roller assembly 186 is mounted on the adjacent sidewall 188 and includes, mounted on a common vertical shaft 190, an elongated central roller 192 and upper and lower smaller rollers 194, all spring-biased in a manner so as to frictionally clamp the film 160 against the metering roller 178.

With reference to FIG. 3, it will be noted that the tape 160 extends from wound engagement about the right-hand spool, over the metering roller 178, between the metering roller 178 and the spring-loaded pressure roller means 186, forwardly around a vertically positioned rotatably mounted guide roller 196, located at the front of the unit 24, across the complete front of the unit 24, around a second rotatably mounted vertical guide roller 198, and rearwardly into wound engagement about the second or left-hand spool. An enlarged white translucent panel or plate 200 is provided between the guide rollers 196 and 198 and constitutes a backing plate for the film 160 as it passes across the front of the unit 24 between the guide rollers 196 and 198. The forward face of the film 160, between the guide rollers 196 and 198, is in turn overlaid with an enlarged transparent viewing window 202 which is mounted on the front wall 204 of the unit 24. As will be appreciated, it is intended that the film 160 be driven progressively across the viewing face of the unit 24 at a speed directly related to that of the vehicle. As noted previously, the actual frequency of the reciprocation of the solenoid armature 100 is controlled from the microswitch in the controller unit 22 which includes means for adjusting the rate at which the microswitch 86 is actuated whereby a synchronization of the movement of the tape 160 is possible. Incidently, with continued reference to FIG. 3, it will be noted that a pair of opposed spring leaves 206 are mounted on the support structure of the solenoid and engage the outer faces of the chain runs 132 so as to resiliently bias these runs slightly inward whereby a positive engagement with the operative pawl 128 is ensured during the driving of the chain 134.

A second pair of spools 208 and 210 are rotatably mounted just inward of the two guide rollers 196 and 198. These two spools 208 and 210 mount an elongated flexible train length indicating film or ribbon 212 which passes over guide rollers 214 immediately forward of the spools 208 and 210 and across the white translucent panel 200 immediately rearward of the viewing window portion of the tape 160. The spool 210 is spring-loaded while the spool 208 has a control knob 216 affixed thereto and positioned immediately above the top wall 116. Thus, the selective movement of the tape 212 across the front of the viewing panel can be effected through a rotation of the control knob 216 in either direction, the spring loading of the spool 210 providing for a winding of the ribbon on the spool 210 upon an unwinding of the spool 208. FIG. 7 is of interest in illustrating the spring-loaded spool 210, while FIG. 6 illustrates, in conjunction with the spool 208, spring-loaded friction discs 218 provided on the shaft 220 of the spool 208 below the deck 150 whereby a frictional resistance to the movement of both spool 208 and spring-loaded spool 210 is developed sufficient so as to overcome the biasing force of the spring of the spool 210 until a positive rotation of the spool 208 is effected through the control knob 216.

With reference to FIG. 15, the train length indicating film or ribbon 212 includes an elongated central section 222 which is transparent, and two opposed side sections 224 and 226 which are colored and translucent, preferably a bright red. The two side sections 224 and 226 define borders 228 and 230 adjacent the opposite ends of the central transparent section 222. With reference to FIG. 2, immediately above FIG. 15, it will be noted that the opposed end portions of the translucent white back panel or plate 200 is provided with brightly colored, also preferably red, vertical borders 232 visible at the opposed edges of the front viewing panel 202. When the unit 24 is to be used in conjunction with a train symbolized as moving from right to left, which would entail the position-indicating film or tape 160 moving from left to right across the viewing panel, the edge 230 of the left hand red portion 226 of the ribbon 212 is positioned to the left of the right-hand panel border 232 a distance equivalent, on the scale of the tape 160, equal to the length of the train which will appear, upon an illumination of the rear of the viewing screen as a full height clear area bordered upon opposite sides by relatively darker areas having a red glow thereto. When the unit 24 is to represent a train moving from left to right, the ribbon border 228 of the right-hand portion 224 of the ribbon 212 is spaced from the left-hand plate border 232 a distance equivalent to the length of the train, thereby presenting, upon an illumination of the rear of the screen, a lighter area on the left-hand portion of the screen corresponding to the length of the train at the scale of the tape 160.

The film or tape 160 itself is normally in the nature of a negative with the pertinent data thereon, including a grade profile line 234, being transparent as compared to the darker nature of the remainder of the tape 160. With continued reference to FIG. 2, the train length indicating ribbon 212 has been adjusted for a train approximately 1⅓ miles long traveling from right to left. It will be noted that the clear area of the ribbon 212 extends from approximately two-thirds of the way to the 111 mile post mark to approximately the 112 mile post mark, such mile post marks being provided along the top of the film or tape 160. As noted previously, this presentation of the entire length of the train in conjunction with an actual pictorial representation of the grade profile of the track over which the entire length of the train is traveling, as well as that being approached by the train, is highly useful in ensuring a proper control of the train. It will of course be appreciated that the clear representation of the length of the train remains stationary as the condition presenting tape 160 travels thereacross.

In order to provide the necessary internal illumination within the indicating unit 24 for presenting a readily visible contrast through the viewing plate, a series, normally four, of light bulbs 236 are mounted on a vertical bar 238 provided centrally within the unit 24 immediately behind the translucent panel 200. The bar 238 is vertically removable from the housing of the unit 24 through a removable top panel 240 so as to facilitate a changing of the bulbs 236. In addition, the bar 238 mounts, at the lower end thereof, a male plug 242 which, upon a positioning of the bar 238 within the unit 24, plugs into a female plug 244 affixed to the housing bottom wall 108, thus providing the necessary electrical connection to supply electrical power to the light bulbs 236. A switch control 246 for the bulbs or lamps 236 is provided on the removable top panel 240 and can be in the nature of a two-way switch providing for a partial illumination, for example only two bulbs 236 as would be sufficient for night use, or full illumination, as would be required to provide the necessary contrast during daytime use. In addition, as will be appreciated from the drawings, auxiliary smaller bulbs 248 can be provided adjacent the outer ends of the translucent panel 200 for ensuring the provision of adequate illumination at these end portions, such bulbs 248 normally being provided in vertical pairs on suitable support members or bars 250.

In order to help dissipate the heat generated by the bulbs, an appropriate turret-type vent 252 can be provided through the top wall 116, and preferably through the light bulb access panel 240 itself. In addition, a pair of shielded vents 253 can be provided through the back wall adjacent the lower edge thereof, such vents 253 comprising, in each instance, one or two apertures through the back wall overlaid by a spaced angle member shield. Incidently, with continued reference to the back wall, it is contemplated that such be provided in sections interconnected by full height piano-type hinges 254 and 256, the hinge 256 actually appearing on a sidewall immediately adjacent the rear wall. These hinges enable, upon the loosening of a few securing bolts, the selective rearward swinging of various portions of the rear wall for access to the interior of the unit 24 for servicing purposes or for the changing of reels or the like.

An appropriate off-on switch 258 is also provided for the solenoid 98 itself, this switch 258 being conveniently located on the top wall 116 and particularly useful in temporarily stopping the profile film tape when this tape has, because of wheel slippage or creeping, exceeded the actual distance traveled.

From the foregoing, it will be appreciated that a highly unique train-handling device has been defined, this device providing for a continuous pictorial representation of the profile of the track being traversed by a train with provision being made so as to illustrate the relationship of the entire length of the train with the track. In addition, the device incorporates means for quickly adapting it to different trains, or for that matter other vehicles, with the device being adjustable for an exact synchronization thereof both through an adjustable speed-controlling unit and adjustments which can be utilized to properly position the profile film tape itself, including an off-on switch on the film-moving solenoid and a manually adjustable metering roller. Also of particular significance is that the device provides means for changing the indicated length of the vehicle so as to correspond exactly with the particular vehicle to which the device is attached, provision also being made so as to accommodate a vehicle moving from left to right or right to left with regard to the pictorial representation on the profile tape.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

We claim:

1. A vehicle location indicator comprising an elongated flexible position-indicating tape, spaced tape-receiving spools, a tape display area between said spools, means for advancing said tape across the display area at a predetermined rate, means for presenting a representation of a vehicle on said tape as it is advanced, and means for varying the length of the vehicle representation to correspond, at the scale of the tape, to the length of a vehicle to which the indicator is to be operatively attached.

2. The indicator of claim 1 wherein said means for advancing the tape across the display area includes means providing electrical impulses in response to travel of an associated vehicle and means receiving said impulses and translating said impulses into mechanical movement to rotate one of said spools and advance the tape in synchronization with the travel of the vehicle.

3. The indicator of claim 2 wherein said means for providing the electrical impulses comprises a microswitch, cam means for periodically activating said switch, and means for adjusting the rate of movement of the cam means.

4. The indicator of claim 3 wherein the means receiving said impulses comprise a solenoid with a reciprocating armature, pawl means on said armature, gear means on said tape spools, an endless chain trained about said gear means, and means for selectively engaging said pawl means with said chain for selective movement of the chain and hence the gear means in opposed directions.

5. The indicator of claim 4 including clutch means between each tape spool and the associated gear means for selectively engaging each gear means with the corresponding spool, and means for effecting a clutched engagement between a first gear means and the associated first spool simultaneously with a declutching of the second gear means with the second spool and with the engagement of the pawl means in a manner so as to rotate the first spool for the winding of the tape thereon, and vice versa.

6. The indicator of claim 5 wherein said cam means is mounted on a rotating shaft, said means for adjusting the speed of movement of the cam means comprising a variable diameter cone on said cam means shaft and friction wheel means adjustably mounted for engagement with different portions of said cone, said friction wheel means constituting drive means for the cam means shaft and being driven in response to movement of the vehicle.

7. The indicator of claim 6 wherein the means for presenting a representation of a vehicle on said tape comprises opposed borders defining an area of contrasting color therebetween visible on said tape within the display area, said area of contrasting color constituting the vehicle representation, said means for varying the length of the vehicle representation comprising means for selectively varying the position of one of the borders relative to the other to change the length of the area therebetween.

8. The indicator of claim 1 wherein the means for presenting a representation of a vehicle on said tape comprises opposed borders defining an area of contrasting color therebetween visible on said tape within the display area, said area of contrasting color constituting the vehicle representation, said means for varying the length of the vehicle representation comprising means for selectively varying the position of one of the borders relative to the other to change the length of the are therebetween.

9. The indicator of claim 1 including a translucent panel spanning said display area behind said tape, illuminating means behind said translucent panel, a distinctive border across one end of said panel visible through said tape overlying the panel, a ribbon positioned between the tape and the panel, a distinctively colored portion on said ribbon of generally equal height with the border and visible through the tape, and means for varying the position of the colored portion relative to the border to correspond the space therebetween to the length of a particular vehicle at the scale of the tape.

10. The indicator of claim 9 including a second distinctively colored border across the second end of said panel visible through the overlying tape within the display area, and a second colored portion on said ribbon variably positionable relative to the second border for the provision of a vehicle representation adjacent the second end of the display area as an alternative to a representation at the first end of the display area.

11. A vehicle location indicator comprising an elongated flexible route information providing tape, a pair of tape spools having the tape wound thereon, a display area positioned for passage of the tape thereover upon movement from one spool to the other, means for advancing the tape across the display area at a predetermined rate, said means for advancing the tape comprising mechanical means periodically activated in response to electrical impulses the frequency of which corresponds to the speed of the involved vehicle, said mechanical means including a gear associated with each spool, clutch means associated with each spool and gear for a selective engagement and disengagement of each gear to its spool for a driving thereof, and an endless chain drivingly engaged with each gear, a power unit, chain-grasping means on said power unit selectively engageable with opposed portions of said chain for a selective movement of said chain in opposed directions, and means synchronizing the engagement and disengagement of the two clutch means with the selective engagement of the chain-grasping means with the opposed portions of the chain, said power unit activating the chain-grasping means for effecting a movement of the chain in either of two directions depending upon the portion of the chain engaged by the chain-grasping means, the movement of the chain, in each instance, being such so as to wind the tape on the spool having the associated gear clutch-engaged therewith.

12. A variable speed drive control unit for an electrically actuated vehicle position indicating unit, said control unit comprising a power takeoff coupling, an elongated drive shaft, gear means drivingly engaging said coupling with said drive shaft for driving of said drive shaft, a speed varying cone rotatably mounted generally parallel and in slightly spaced relation to said drive shaft, a friction wheel slidably mounted on said drive shaft and drivingly engaged with said cone, means for varying the longitudinal position of said wheel along said drive shaft for varying the point of engagement with said cone and thereby varying the rate of rotation of said cone, an enlarged camming wheel mounted on said cone for rotation thereby, said camming wheel including a plurality of camming portions provided at spaced points peripherally thereabout, and switch means engaged with said camming wheel for periodic activation by the camming portions upon a rotation of said camming wheel and means for transmitting electrical impulses originating with said switch means.

13. A vehicle location indicator comprising an elongated position indicating tape, a tape display area, means for advancing said tape across the display area at a predetermined rate, means for presenting a representation of a vehicle on said tape as it is advanced, and means for varying the length of the vehicle representation to correspond, at the scale of the tape, to the length of a vehicle to which the indicator is to be operatively attached.

14. The indicator of claim 13 wherein the means for presenting a representation of a vehicle on said tape comprises opposed borders defining a vehicle area within the display area, said vehicle area constituting the vehicle representation, said means for varying the length of the vehicle representation comprising means for selectively varying the position of one of the borders relative to the other border to change the length of the area therebetween.

15. A vehicle location indicator comprising an elongated flexible route information providing tape, a pair of tape spools having the tape wound thereon, a display area positioned for passage of the tape thereover upon movement from one spool to the other, means for advancing the tape across the display area at a predetermined rate, said means for advancing the tape comprising mechanical means periodically activated in response to electrical impulses the frequency of which corresponds to the speed of the involved vehicle, said mechanical means including clutch means associated with each spool for a selective engagement and disengagement of each spool for a driving thereof, and an endless drive member drivingly engaged with each spool through the associated clutch means, a power unit, drive members engaging means on said power unit selectively engageable with opposed portions of said drive member for a selective movement of said drive member in opposed directions, and means synchronizing the engagement and disengagement of the two clutch means with the selective engagement of the drive member engaging means with the opposed portions of the drive member, said power unit activating the drive member engaging means for effecting a movement of the drive member in either of two directions depending upon the portion of the drive member engaged by the drive member engaging means, the movement of the drive member, in each instance, being such so as to wind the tape on the spool having the associated clutch means engaged therewith.